E. BUGATTI.
SPRING SUSPENSION FOR VEHICLES.
APPLICATION FILED DEC. 29, 1911.

1,055,314.

Patented Mar. 11, 1913.

3 SHEETS—SHEET 1.

Witnesses:—
D. F. Schilling
Frank Finson

Inventor:—
Ettore Bugatti
by Paul P. Schilling
his attorney

E. BUGATTI.
SPRING SUSPENSION FOR VEHICLES.
APPLICATION FILED DEC. 29, 1911.

1,055,314.

Patented Mar. 11, 1913.

3 SHEETS—SHEET 2.

E. BUGATTI.
SPRING SUSPENSION FOR VEHICLES.
APPLICATION FILED DEC. 29, 1911.

1,055,314.

Patented Mar. 11, 1913.

3 SHEETS—SHEET 3.

Witnesses:—
D. F. Schilling
Frank Finney

Inventor:—
Ettore Bugatti
By Paul Schilling
his attorney

UNITED STATES PATENT OFFICE.

ETTORE BUGATTI, OF MOLSHEIM, GERMANY.

SPRING SUSPENSION FOR VEHICLES.

1,055,314.  Specification of Letters Patent.  Patented Mar. 11, 1913.

Application filed December 29, 1911. Serial No. 668,498.

*To all whom it may concern:*

Be it known that I, ETTORE BUGATTI, a subject of the King of Italy, and residing at Molsheim, Alsace, German Empire, have invented certain new and useful Improvements in Spring Suspension for Vehicles, of which the following is a specification.

The present invention has reference to improvements in means for elastically connecting the frame or body of vehicles, preferably of automobiles, with the wheel axles, and it relates more specifically to a novel manner of securing single armed suspension springs to the frame and the wheel axles respectively, and the particular object of my invention is to obtain a safe, simple and effective spring support for the frame, conducive to comfortable riding, with relatively little up and down play, and also a certain lateral play to counteract one-sided strain on the parts, occasioned by obstructions in the road-bed with consequent sidewise lunges of the vehicle.

In prior methods of suspension in this manner, the distance between the points of attachment of the single-armed springs to the body is equal to, or less than, the distance between the axles. This mode of mounting has the defect that on shocks arising, in consequence of inequalities in the road, the up and down motion of the entire vehicle is greatly increased, and, moreover, owing to the one-sided loading due to such shocks, the springs are subjected to strains in lateral direction. These drawbacks are entirely obviated by means of the present invention, which I will now proceed to describe in detail, reference being had to the accompanying drawings, in which—

Figure 1:
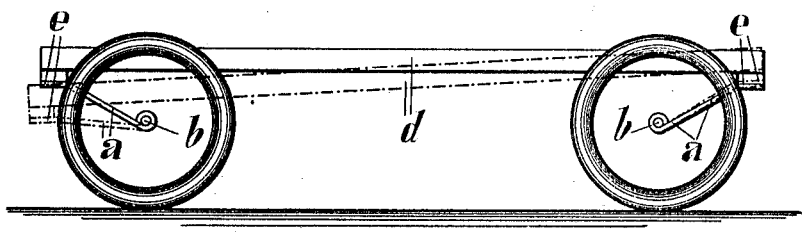
Figure 2:
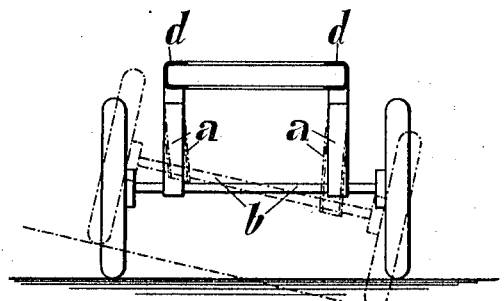
Figure 3:
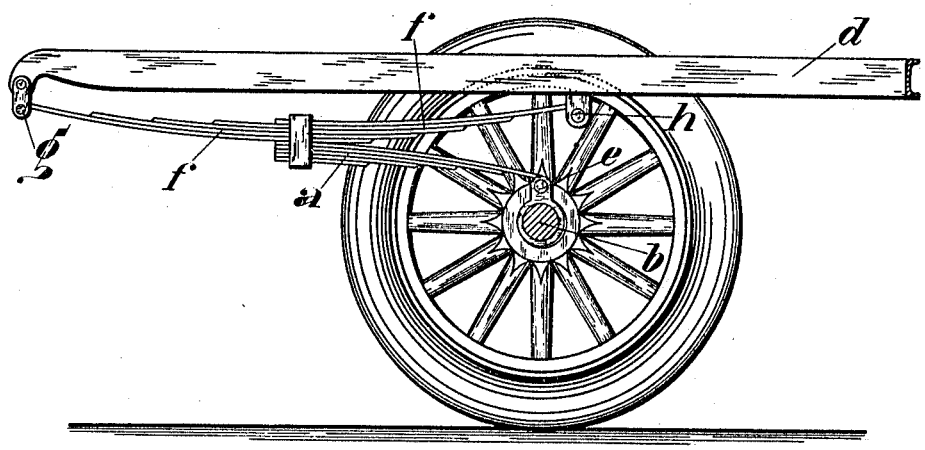
Figure 4:
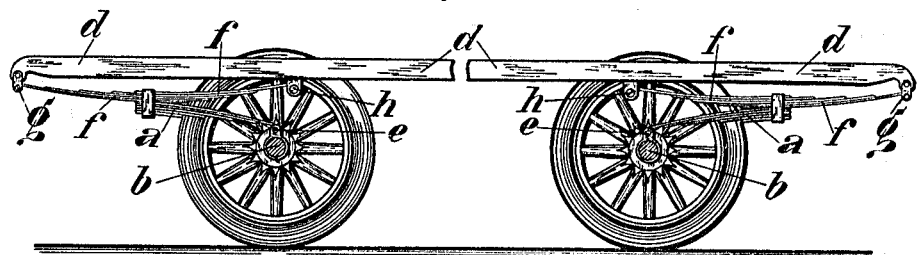
Figure 5:
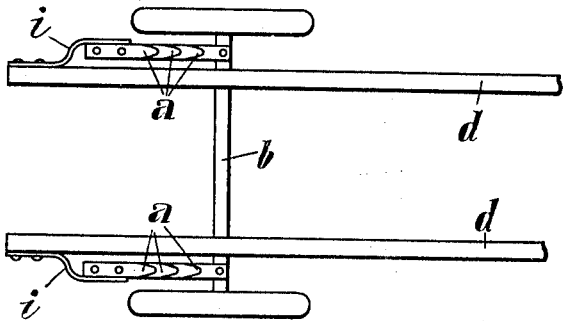
Figure 6:
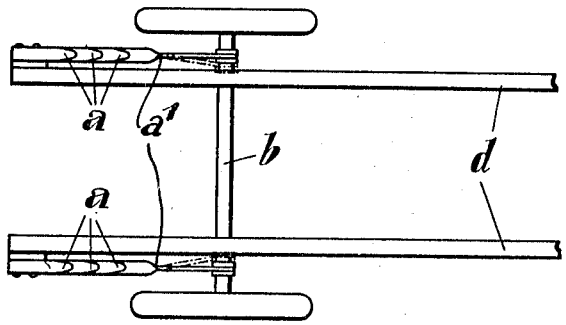
Figure 7:
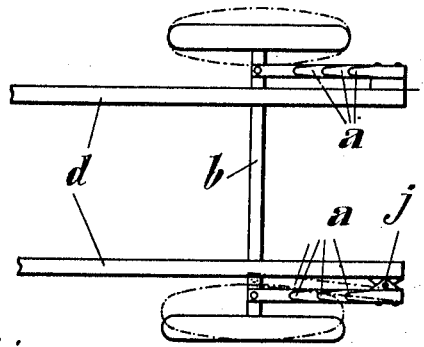

Figure 1 is a view, showing the frame mounted according to this invention. Fig. 2 is a cross section through Fig. 1. Fig. 3 is a fragmental sectional view showing a method of suspension in which the single-armed spring is fastened to a double-armed one. Fig. 4 is a sectional view illustrating a modification of the manner of suspension shown in Fig. 3. Figs. 5, 6 and 7 are fragmental plan views illustrating three particular ways of applying the single-armed springs with capability of yielding in lateral direction.

In employing single-armed springs $a$ it has heretofore been customary to fasten one end to the axle $b$ and the other end to the frame $d$ at a point located intermediately of the axles.

According to my invention, as illustrated in Fig. 1, the springs $a$ are fastened at points, such as $e$, at the ends of the frame $d$, so that the distance between the points of attachment $e$, $e$ is greater than the distance between the axles $b$, $b$, instead of being less, as in the ordinary arrangement. If, with this construction, the springs of the two axles are unequally loaded, such as is usually the case when traveling over an uneven road, the swing of the frame will be less than with the customary arrangement.

In the modified constructions illustrated in Figs. 3 and 4 the single-armed springs $a$ are attached at one end to the axle $b$ and at the other end to double-armed springs $f$ of familiar type, whose extremities are fastened to the vehicle-frame at $g$, $h$ in suitable manner. Such ways of suspension also admit of the axle assuming an inclined position relatively to the frame, as can be seen from Fig. 2. In the event, however, of one-sided loading of the springs $a$ incident to jars, in consequence of unevenness or obstructions in the road, the springs are subjected to strains not only in the vertical, but also in the lateral direction. In order to meet this, the springs $a$ may be so constructed, or so secured, that they are capable of adjusting themselves laterally as well as vertically.

In the arrangement shown in Fig. 5 this is attained by the springs $a$ being attached at one end to the frame $d$ by means of auxiliary springs $i$ which vibrate laterally.

According to the construction illustrated in Fig. 6 the same end is secured by the lowermost leaf of the laminated spring $a$ being twisted at $a^1$ before being secured to the axle $b$. Or, as shown in Fig. 7, one of the springs $a$ may be rigidly secured to the frame $d$, while the other is pivotally connected to the latter at $j$ with capability of motion in transverse direction. On the springs being unequally strained, the pivotal spring $a$ can turn from the full-line into the dotted-line position, while the other spring $a$ may be regarded as non-resilient in respect of lateral motion relatively to the frame $d$.

Having thus described my invention, I claim as new—

1. The combination with a vehicle frame and wheel support, of sets of relatively short, slightly curved, single-armed springs, each respectively secured to the wheel support and to the extremity of the vehicle frame, and the front and rear sets respectively extending toward each other with their operative ends.

2. The combination with a vehicle frame and wheel support, of sets of relatively short, slightly curved, single-armed springs, each respectively secured to the wheel support and to the extremity of the vehicle frame, all practically within the contour of the vehicle frame.

3. The combination with a vehicle frame and wheel support, of sets of single-armed leaf-springs, each such spring being elastically attached with one end to the respective vehicle frame end and secured with the other end to the wheel support, and the front and rear sets respectively extending toward each other from their point of elastic attachment.

In testimony whereof I affix my signature in presence of two witnesses.

ETTORE BUGATTI.

Witnesses:
 WARREN E. SCHUTT,
 JOSEPH DOHMER.